May 30, 1933.  F. MALLGRAF  1,911,702
BIRD HOUSE
Filed May 12, 1931   3 Sheets-Sheet 2
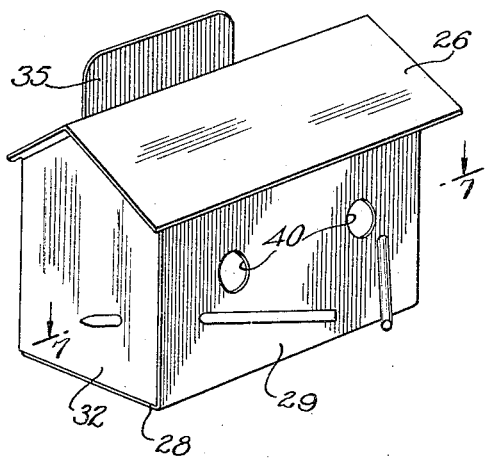
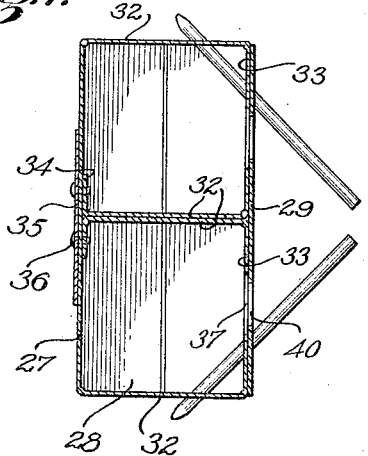
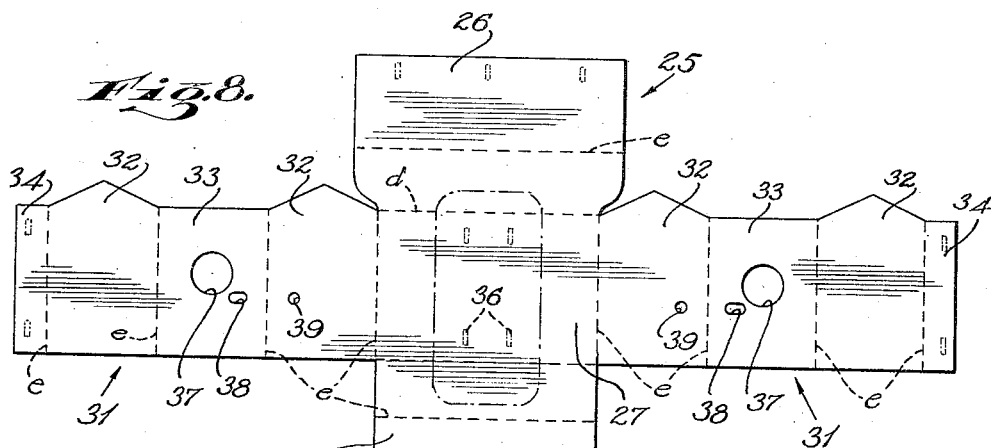
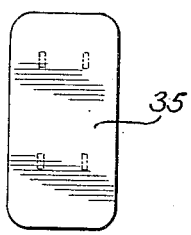
INVENTOR.
FERDINAND MALLGRAF
BY Meyers & Jones
ATTORNEYS.

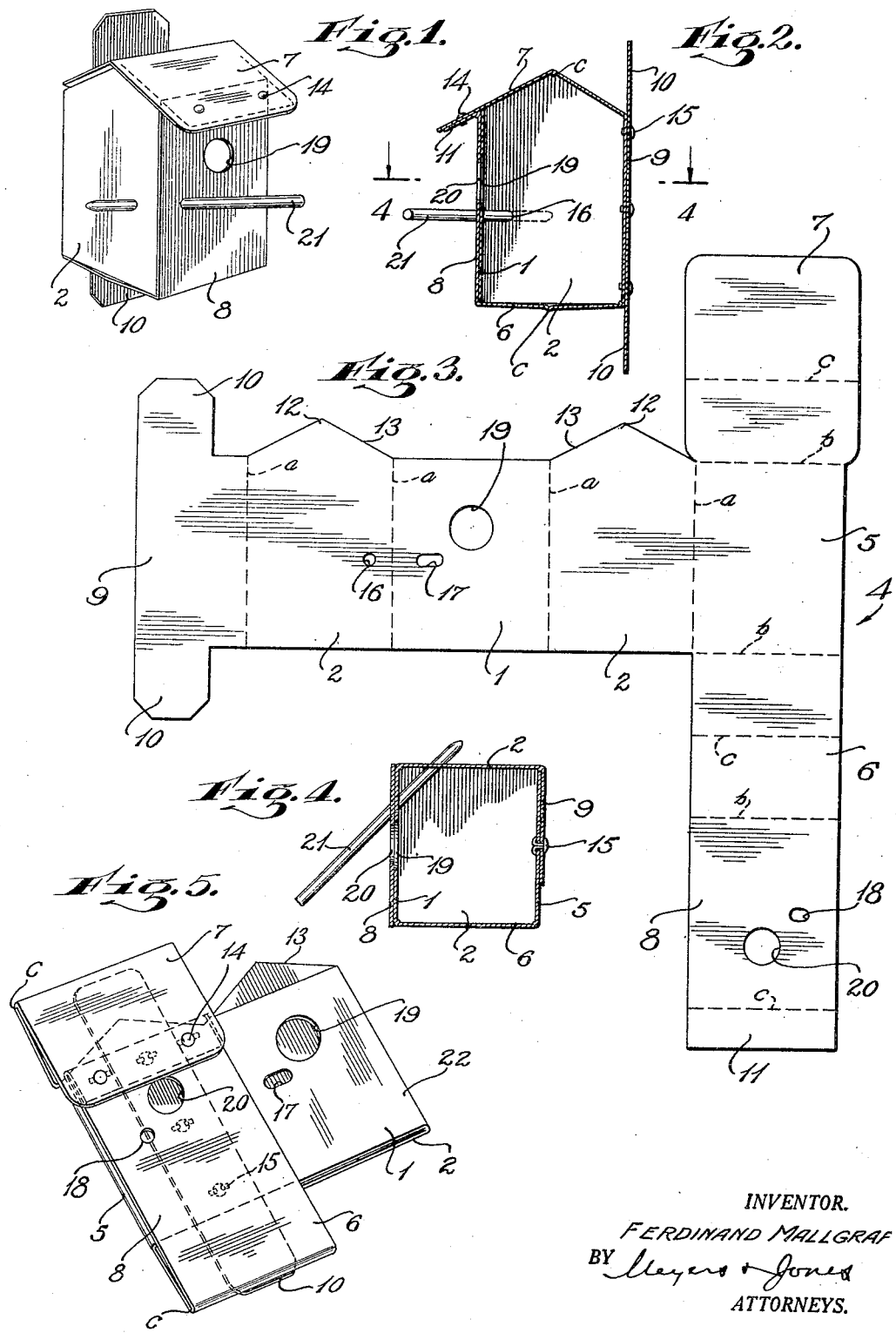

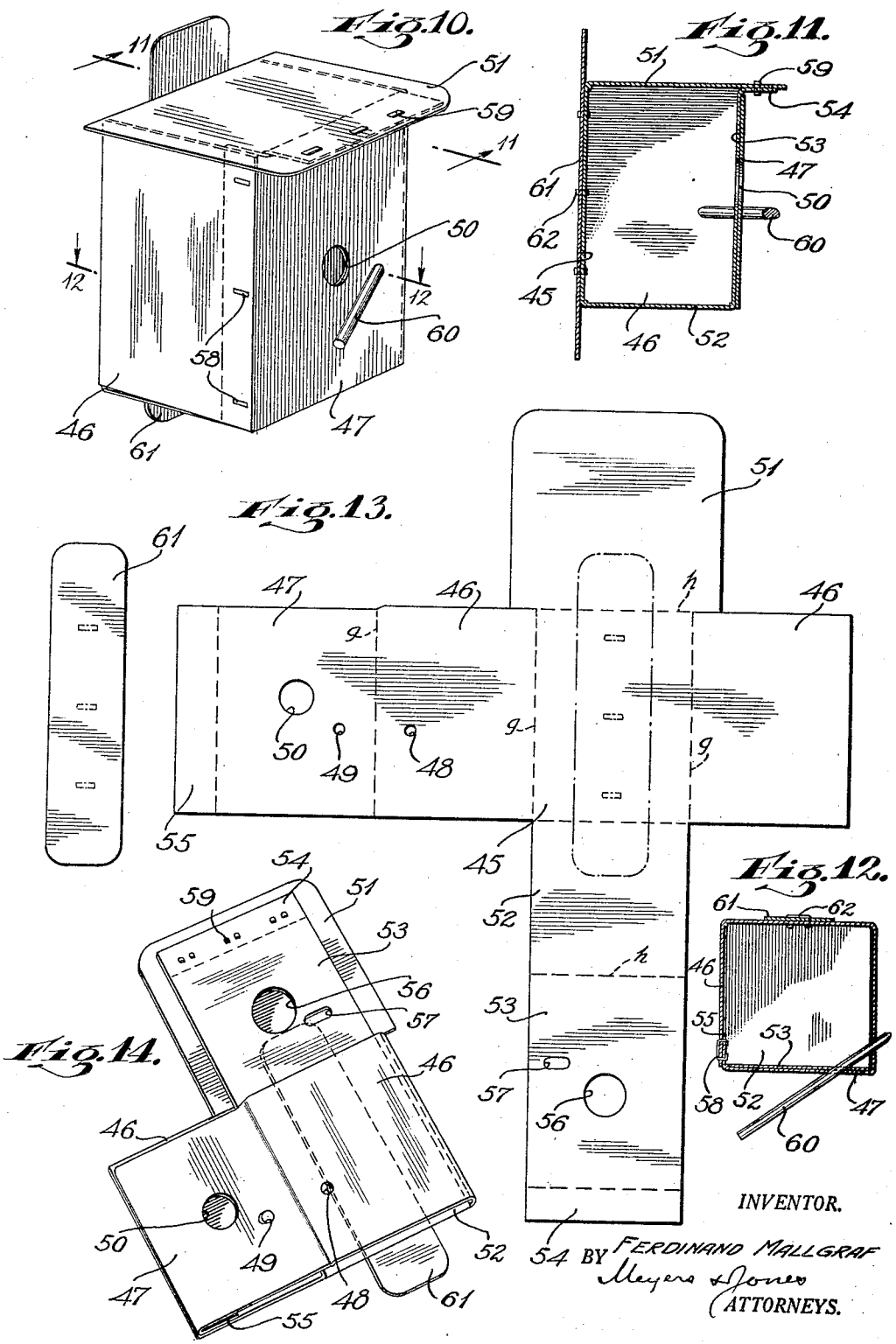

Patented May 30, 1933

1,911,702

UNITED STATES PATENT OFFICE

FERDINAND MALLGRAF, OF LITTLE NECK, NEW YORK

BIRD HOUSE

Application filed May 12, 1931. Serial No. 536,362.

My invention relates to bird houses.

An important object of the invention is to provide a bird house which can be collapsed for transportation and storage, readily moved into extended position and mounted on a supporting structure.

Another object of the invention is to provide a bird house of the above character which can be produced cheaply and in great quantity from a single blank.

Another object of the invention is to provide a collapsible bird house provided with a separable perch, the perch serving to hold the house in extended position.

Other objects and advantages of the invention will become apparent during the course of the following detailed description of the accompanying drawings wherein are shown representative embodiments of the invention and in which Fig. 1 is a perspective view of a bird house in position for use.

Fig. 2 is a vertical central longitudinal sectional view through the structure shown in Fig. 1.

Fig. 3 is a plan view of the blank from which the house is formed;

Fig. 4 is a sectional view on the line 4—4 of Fig. 2 and

Fig. 5 is a perspective view of the structure in assembled but collapsed position.

Fig. 6 is a perspective view similar to Fig. 1 of a similar structure showing how more than one compartment or house can be formed from a single blank.

Fig. 7 is a sectional view on the line 7—7 of Fig. 6.

Fig. 8 is a plan view of the form from which the structure shown in Fig. 6 is formed.

Fig. 9 is a detailed plan view of a support.

Fig. 10 is a perspective view of a modification.

Fig. 11 is a sectional view of the line 11—11 of Fig. 10.

Fig. 12 is a sectional view of the line 12—12 of Fig. 10.

Fig. 13 is a plan view of the form and support from which the structure shown in Fig. 10 is formed, and Fig. 14 is a perspective view of the house shown in Fig. 10 in collapsed position.

Referring to Figs. 1–5 of the drawings the numeral 1 designates a panel forming part of the front of the house which is integrally connected to the adjoining side panels 2, creases $a$ being provided between the front panel 1 and sides 2. At the end of one of the side panels 2 an elongated strip 4 extends beyond the top and bottom of the side 2 to provide the back 5, bottom 6, top 7 and outer front panel 8, and at the end of the other side panel 2 there is a flap 9 having projections 10 extending beyond the top and bottom of the sides 2 to afford tabs by which the house may be held on a supporting structure or surface. It will be noted that there are also creases $a$ between the flap 9 and side 2 and between the other side 2 and back 5, while creases $b$ extending at right angles to the plane of the creases $a$ are provided between the top 7, back 5, bottom 6 and front 8. There are also creases $c$ across the top 7 and bottom 6 and between the front 8 and a tab 11, which tab is adapted to be secured to a portion of the top 7 when the form is assembled and the flap 9 is secured to the back 5.

The top 7 is wider and longer than the bottom 6 and the crease $c$ is positioned so that it will be disposed on the points 12 formed by the converging top edges 13 of the sides 2.

The form is assembled by bending the parts 9, 2 and 1 on creases $a$, and then securing flap 9 to the back 5 by rivets 13 or other suitable means thus forming a tubular rectangular structure. The top 7 is swung down on crease $b$ until its inner surface contacts the sloping edges 13 of the side 2 with the points 12 disposed against the crease $c$ of the top. The crease $b$ between the bottom 6 and front 8 is brought against the lower edge of the portion 1 so that the front 8 will be disposed against and over the part 1 with the tab 11 against the front projecting portion of the top 7 to which it is secured by the rivets 14.

It will be noted that one of the sides is provided with an opening 16 and that the front pieces 1 and 8 are each provided with slightly elongated openings 17 and 18 respectively and in substantially the same plane with the opening 16. Enlarged openings 19 and 20 in front panels 1 and 8 afford the entrance to the house, it being understood that the openings 17 and 18 and the openings 19 and 20 register when the front 8 is folded over the front 1 as above explained.

The house assembled in the above manner is shown in Figs. 1, 2 and 4 with a perch 21 extending through the registering openings 17 and 18 diagonally across the corner of the box and through the openings 16 in the side with a substantial portion out in front of the entrance 19. Thus an attractive, practical and novel means is provided for holding the box in extended position.

The box may be made of any suitable material such as heavy cardboard or other foldable material and can be painted or otherwise decorated and can be supplied in the collapsed form shown in Fig. 5 where the sides and front portion 1 have been swung laterally as the back 5 and front portion 8 move toward each other with the top and bottom folding on their creases c. The box received in this condition is extended to the position shown in Fig. 1 simply by pushing the edge between the front 1 and side 2, indicated at 22 in Fig. 5, so that the front portion 1 will slide against the front portion 8 and the sides 2 will swing into a position substantially at right angles to the back 5 and front 8 until the edges 13 are beneath the top 7 and the openings 19 and 20 and 17 and 18 register.

Referring to Figs. 6–9 wherein is shown a modification for providing from a single blank a plurality of houses, a relatively wide vertical strip 25 includes panels for a top 26, back 27, bottom 28, front 29 and flap 30, all divided by creases d, and the top and bottom are each provided with creases e. For the purpose of description it will be understood that the creases d correspond in purpose and location to the creases b in Fig. 3 and the creases e correspond to the creases c in Fig. 3. At opposite sides of the bottom panel 27 there are relatively narrow elongated strips 31 each of similar construction and including side panels 32, front panels 33 and tabs 34. A separate support 35 is provided in connection with this form of the invention and is secured to the back 27 by any suitable means such as rivets 36. Each of the front panels 33 is provided with an enlarged entrance opening 37 and a slot 38 to receive the perch while sides 32 are provided with perch receiving openings 39 and the front panel 29 is provided with two entrance openings 40 and two perch receiving openings 41.

The blank shown in Fig. 8 is folded to form the house as shown in Fig. 7 by folding the strips 31 on the creases e between the front 33, sides 32 and back 27 so that the tabs 34 will be disposed against the back 27 with two of the sides 32 abutting each other and extending centrally out from the back 27. The flaps 34 can then be secured to the back 27 by the rivets 36 which also secure the support 35 to the back. The top 26 is now folded down on crease d and then folded along crease e, it being understood that the crease e is immediately above the points on the top of the sides 32 and the inner surface of the top is disposed against the sloping edges of the sides 32 the same as in the structure disclosed in Fig. 1. The bottom is then folded up and the front 29 is brought against the front portions 33 with the holes 40 registering with the holes 37 and the opening 41 registering with the openings 38. The flap 30 is then secured to the front projecting portion of the cover 26 the same as described in connection with Figs. 1–5.

The house above described is collapsed and extended in exactly the same manner as the single house except that the opposite sides fold in opposite directions and project outwardly from each side of the front 29 and back 27.

The structure shown in Figs. 10–14 is constructed from the form or blank shown in Fig. 13 wherein the back panel 45 has integrally connected thereto along the creases g the sides 46, the front panel 47 being connected to one of the sides 46 along another crease g. Perch openings 48 and 49 are provided in the panels 46 and 47 respectively and the entrance opening is also provided in the front panel 47. The top 51 is connected to the back panel 45 by the crease h, the top being of greater dimensions than the bottom 52. Another front panel 53 is connected along crease h to the bottom 52 and a tab 54 is provided at the outer end of the front panel. A similar tab 55 is provided at the end of the other front panel 47. As in the case of the structure disclosed in Figs. 1–9 the front panel 53 has an entrance opening 56 and a perch opening 57 to register with the entrance opening and perch opening in the panel 47 when the blank is folded along the creases and extended to open position as shown in Figs. 10–11.

To assemble the blank shown in Fig. 13 the sides 46 are folded on creases g and the front 47 is also folded on crease g so that it will be parallel to the back panel 45 and the tab 55 is then secured to the side 46 as by staples or rivets 58 thus providing a tubular four-wall blank. The tab 54 and front panel 53 are folded up on creases h and passed up between the side walls and front and back panels 47, and the top 51 is folded down on crease h after which the tab 54 is secured to the front portion of the top 51 as by rivets 59.

Referring to Fig. 14 it will be apparent that the house is collapsed by swinging the bottom 52 and front panel 53 up against the back 45 and top 51, while the sides and front panel 47 swing laterally with one side panel 46 disposed against the bottom 52 and a portion of the front panel 53, and with the front panel 47 and other side 46 to one side of the other panels. The collapsed form is extended to open position as shown in Fig. 10 simply by pressing inwardly on the side 41 which is to one side of the other panels and downwardly on the top 51 until the flap 54 contacts the upper edge of the front panel 47 as shown in Fig. 11 at which time the perch openings and entrance openings will be in alinement so that the perch 60 may be inserted as shown in Fig. 12 to hold the house in extended or open position. While I have shown a separate support 61 secured to the back 45 by means of rivets 62 it is possible to provide the support as an integral part of the blank if desired.

It will be noted that in all forms of the invention that the collapsible bird house is held in open position by means of the perch, which affords a very economical and novel as well as practical means for holding the parts in related positions. It will also be noted that the tops of the several houses provided as an integral part of the structure extend beyond the top edges of the sides and front to provide a roof protecting the interior of the house against the entrance of rain.

I do not limit the invention to the use of any particular material, nor to the use of a single blank as it will be obvious that the invention as described and claimed may be practised by providing a collapsible bird house the walls and top and bottom of which may be folded and extended in a manner substantially as shown and described in the drawings by hinging the panels together so as to form a seal between the edges thereof.

What I claim is:

1. A collapsible bird house having walls and end closures provided by two relatively movable tubular parts, openings through two adjacent walls of one part and one wall of the other part, and a perch mounted diagonally through said openings to hold the house in extended position, the perch being removable to permit collapsing of the house.

2. A collapsible bird house including front, back and side panels interconnected for swinging movement to form a tubular structure, top and bottom panels swingably connected to said tubular structure, and a member connected between said top and bottom and movable therewith so that folding and unfolding movement of either top or bottom will be imparted by said member to the other when the house is collapsed or extended.

3. A collapsible bird house comprising strips one provided with interconnected panels to form the sides, front and back of the house and the other provided with panels to provide the top and bottom, the top being of greater dimensions than the bottom, a connection between the top and bottom panels to impart folding and unfolding movements of one to the other, and means engageable with said connection and at least one panel for holding all of the panels in non-collapsed extended position.

4. A collapsible bird house comprising front and back panels, the front panel having an entrance opening therein, bottom and top panels connected to the front and back panels, and a connection between the upper end of the front panel and the forward end of the top panel, side panels connected to the back, and a supplementary front panel connecting said side panels and having an entrance opening to register with the opening in said first front panel, said panels being interconnected to assume a flat collapsed position and an extended position forming a house.

5. The structure described in claim 4 wherein openings are provided through two adjoining panels and said supplementary panel, and a perch is mounted diagonally through said openings to hold the house in extended position and is removable therefrom to permit collapsing of the house.

6. A collapsible bird house comprising relatively long front, bottom, back and top panels interconnected for collapsing folding movement, a plurality of hingedly connected relatively narrow panels carried by one of the relatively long panels at opposite ends thereof for folding collapsing movement with the relatively long panels and for folding movement into the structure defined by the relatively long panels in extended position to close the ends thereof and to provide a partition dividing said house into a plurality of compartments.

7. A collapsible bird house comprising two connected strips each having a plurality of panels foldable in different directions to form two tubular frames with panels of each strip closing the open ends of the tubular frame formed by the other, one of said panels which closes one of said open ends being of greater dimension than said end to constitute a stop to movement of the strip on which it is carried relative to the other.

8. A collapsible bird house comprising two connected strips each having a plurality of panels foldable in different directions to form two tubular frames with panels of each strip closing the open ends of the tubular frame formed by the other, and with a panel on each strip disposed against a panel on the other strip, and means engaging said two panels to hold the strips in extended position with the ends of the tubular frame closed to form the house.

9. A collapsible bird house comprising two connected strips each having a plurality of panels hingedly connected and movable in different directions to form two tubular frames providing a box-like structure, a panel on one strip being slidably engageable with a panel on the other strip whereby movement of one strip to extened position imparts movement to the other to form said box-like structure.

10. A collapsible bird house comprising two connected strips each having a plurality of panels hingedly connected and moveable in different directions to form two tubular frames providing a box-like structure, a panel on one strip being engageable with a panel on the other strip whereby movement of one strip to extended position imparts movement to the other to form said box-like structure, said last named panels having openings positioned to register when the strips are relatively positioned to form said box-like structure, and one of the other adjacent panels is also provided with an opening whereby a perch may be inserted through all of said openings to maintain the strips in said positions forming said box-like structure.

11. A collapsible bird house including front, side and back panels hingedly connected and movable to extended position to form a tubular four wall structure, a top hingedly connected to one of said panels and movable to close one end of the tubular structure, a bottom hingedly connected to one of said panels and movable to a position closing the other end of said structure, a supplemental panel connected to said top and bottom, and means engaging walls of said tubular structure and said supplemental panel to hold said tubular structure in extended position with said top and bottom closing the ends thereof.

12. A collapsible bird house including front, side and back panels hingedly connected and movable to extended position to form a tubular four wall structure, a top hingedly connected to one of said panels and movable to close one end of the tubular structure, a bottom hingedly connected to one of said panels and movable to a position closing the other end of said structure, a supplemental panel connected to said top and bottom, adjacent walls of said tubular structure being provided with openings and said supplemental panel having an opening registrable with one of said first openings, and a perch removably mounted through all of said openings to hold said tubular structure in extended position with said top and bottom closing the ends thereof.

Signed at New York, in the county of New York and State of New York this 5th day of May A. D. 1931.

FERDINAND MALLGRAF.